(No Model.)
H. W. CLELLAND & F. J. MADDEN.
AUTOMATIC ELECTRICAL BATTERY CUT-OUT.
No. 561,565. Patented June 9, 1896.
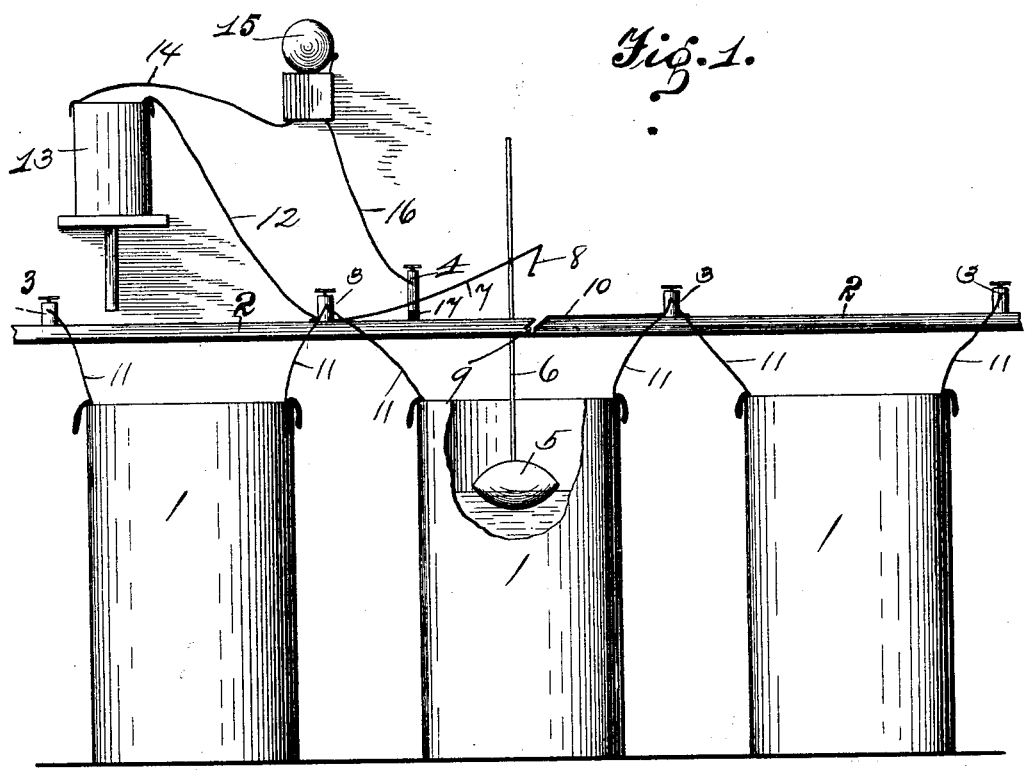
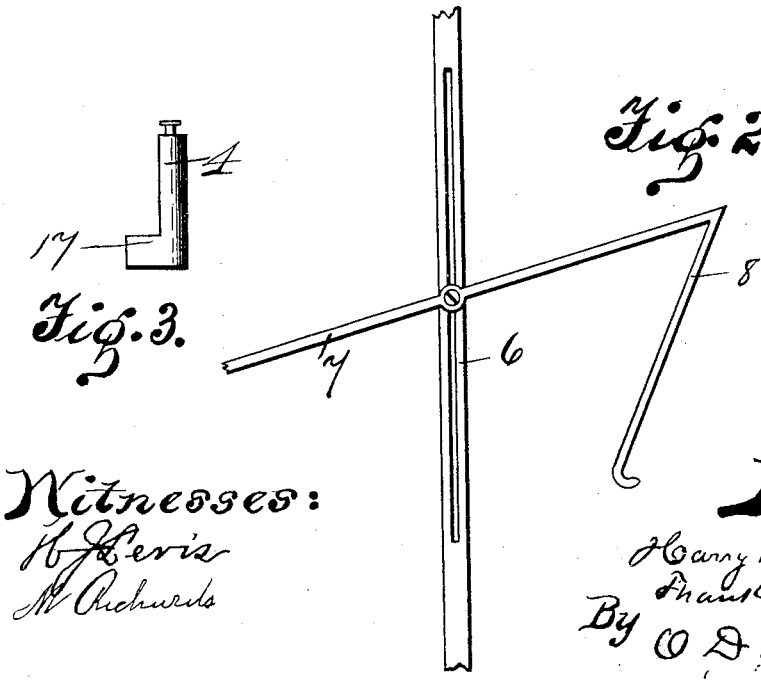
Witnesses:
H. J. Levis
N. Richards
Inventors
Harry W. Clelland
Frank J. Madden
By O. D. Levis Atty.

UNITED STATES PATENT OFFICE.

HARRY W. CLELLAND AND FRANK J. MADDEN, OF WILKINSBURG, PENNSYLVANIA.

AUTOMATIC ELECTRICAL BATTERY CUT-OUT.

SPECIFICATION forming part of Letters Patent No. 561,565, dated June 9, 1896.

Application filed December 11, 1895. Serial No. 571,826. (No model.)

*To all whom it may concern:*

Be it known that we, HARRY W. CLELLAND and FRANK J. MADDEN, citizens of the United States, residing at Wilkinsburg, in the county of Allegheny and State of Pennsylvania, have invented certain new and useful Improvements in Automatic Electrical Battery Cut-Outs; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to certain new and useful improvements in electrical annunciators and cut-offs, and relates more particularly to those that are automatic in their operation.

The invention has for its object to provide an annunciator and cut-off that will be particularly adapted for use in batteries that are placed in obscure places, as is often the case, and that are not inspected regularly.

A further object of the invention is to provide an annunciator and cut-off of the above-described class that will automatically indicate the condition of the battery when the charge in the jar becomes low.

With the above and other objects in view the invention finally consists in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout the different views, in which—

Figure 1 is a front elevation of a battery, showing the float and adjustable rod in position. Fig. 2 is a detail view showing section of float-rod and connecting-rod and manner of adjusting. Fig. 3 is a detail view of the binding-post.

In the drawings, 1 1 1 represent the battery-jars, which are placed in any desired position. A slight distance above the battery-jars is placed a strip or shelf 2, which carries binding-posts 3 3 3 and a binding-post 4. A float 5 is placed in the battery and carries a vertical rod 6, said rod being slotted and carrying an adjustable arm 7, which is provided with a hook portion 8 on one end and the other end secured to a binding-post 3. The shelf 2 is provided with a groove 9, having therein one end of a connecting-wire 10, the other end of said connecting-wire being secured to a binding-post 3. Wires 11 11 11 11 are connected from the batteries to the binding-posts 3 3 3 3, and a wire 12 is connected to a binding-post 3 and an auxiliary battery 13, placed a short distance above the shelf 2. A wire 14 connects from the auxiliary battery to the bell 15, which is also provided with a wire 16, connected to the binding-post 4. The binding-post 4 is provided with a connecting plate or clamp 17.

For the purpose of illustrating our invention we will assume that the batteries have been arranged and the parts placed in proper position, as shown in Fig. 1 of the drawings. When the charge in the jar 1 diminishes, the float will gradually descend or be carried down with the charge, and the rod 6 will carry the adjustable arm 7 downward until the same comes in contact with the connecting-plate 17 on the binding-post 4. At the same time the hook portion on the arm 7 will engage the groove 9 and the connecting-wire 10 and by this means complete the circuit to the other jar 1. Simultaneous with this operation the arm 7, by connecting on the clamp 17, will have completed the circuit to the bell 15, which will cause the same to ring, and thus give warning of the condition of the charge in the jar which has been used.

Any desired material may be used for the construction of the float, though it will be found much more desirable to use a float composed of a suitable metal for this purpose, as the same being heavier will give better satisfaction in the strong solution which is used for the battery.

As shown in Fig. 2 of the drawings, the arm on the float-rod is adjustable by having a slot in the float-rod, and by this means the method of regulating will be readily observed. In this illustration and description we have only shown the float as applied to one jar, though it will be readily apparent that the device could be arranged in the same manner to any number of batteries desired.

It will be noted that various changes may be made in the details of construction of our improved annunciator and cut-off without departing from the general spirit of our invention, and we therefore do not wish to limit ourselves to the specific construction of our device as herein shown.

Having fully described our invention, what we claim as new, and desire to secure by Letters Patent, is—

1. In an automatic electrical annunciator and cut-off the battery jar or receptacle provided with a float carrying a vertical rod, said rod being slotted and passing through a suitable shelf arranged above the battery carrying binding-posts for connecting the wires, an adjustable arm having a hook on one end, the other end being secured to a binding-post and a wire connecting an auxiliary battery to a bell, all parts being arranged and operating, substantially as shown and described.

2. In an automatic electrical annunciator and cut-off, a battery or series of batteries suitably connected by wires to binding-posts arranged in any suitable manner, said batteries carrying a float having an upright rod secured thereto, said rod being slotted and provided with an adjustable arm having a hook portion, and a wire connecting an auxiliary battery to a bell, substantially as shown and described.

3. An automatic electrical annunciator and cut-off consisting of a battery or a series of batteries suitably connected by wires and binding-posts, a float carrying a vertical rod having secured thereto an adjustable arm adapted to engage a connecting-wire and a clamp arranged on a binding-post said binding-post also having a wire connecting with a bell suitably arranged and an auxiliary battery having wires leading to the bell and a binding-post, all parts being arranged and operating substantially as shown and described.

In testimony whereof we affix our signatures in presence of two witnesses.

HARRY W. CLELLAND.
FRANK J. MADDEN.

Witnesses:
ALBERT J. WALKER,
H. J. LEVIS.